Patented May 5, 1931

1,803,331

UNITED STATES PATENT OFFICE

HUGO KLADIVKO, JR., OF BUFFALO, NEW YORK, ASSIGNOR TO NATIONAL ANILINE & CHEMICAL COMPANY, INC., OF NEW YORK, N. Y., A CORPORATION OF NEW YORK

PROCESS OF MAKING 4.4'-TETRAETHYLDIAMINODIPHENYLMETHANE

No Drawing. Application filed April 3, 1923. Serial No. 629,709.

This invention relates to improvements in the manufacture and production of 4.4'-tetraethyldiaminodiphenylmethane.

It is well known that 4.4'-tetraethyldiaminodiphenylmethane can be produced by the action of formaldehyde on diethylaniline in the presence of mineral acids, such as hydrochloric acid or sulfuric acid, and that the yield and quality of the product is dependent upon the relative quantities and concentration of the interacting substances, and the temperature at which the reaction is brought about.

It has been also heretofore proposed to make 4.4'-tetraethyldiaminodiphenylmethane by the action of salts of diethylaniline on diethylaminobenzylsulfanilic acid. Prior proposals involve the preparation and isolation of diethylaminobenzylsulfanilic acid and subsequent treatment with diethylaniline hydrochloride in making 4.4'-tetraethyldiaminodiphenylmethane.

According to the present invention, 4.4'-tetraethyldiaminodiphenylmethane is produced by the action of formaldehyde on diethylaniline in the presence of a sulfonic acid of a primary aromatic amine, which is not capable of alone forming a stable anhydroformaldehyde compound. The amino aromatic sulfonic acid may be used in molecular proportions but I have found that these proportions are not necessary; and I have found that the process can be carried out in a particularly advantageous manner with an amount of the sulfonic acid which represents but a small fraction of the molecular proportions.

In carrying out the present invention, the diethylaniline in solution or suspension in water, and with or without the presence of a miscible or an immiscible diluent or solvent, is treated with the primary aromatic amine sulfonic acid in the presence of sulfuric or hydrochloric acid, and the mixture subjected to the action of formaldehyde until the reaction is complete in the production of 4.4'-tetraethyldiaminodiphenylmethane.

The following example will serve to illustrate the invention, the parts specified being by weight.

*Example.*—1000 parts diethylaniline, 1000 parts water, 50 parts alcohol, 12 parts crystallized sodium sulfanilate, 11 parts sulfuric acid (66° Bè.) and 290 parts formaldehyde (40 percent solution) are placed in the order named, in a steam jacketed, lead lined kettle, equipped with an agitator, a reflux condenser and a recording thermometer. The well-stirred and thoroughly agitated mixture is heated to 95–100° C. until the reaction is complete. This usually requires about 20–25 hours. The reaction may be regarded as complete when the product has obtained its maximum melting point as shown by test on successive samples taken from the reaction mixture.

When the reaction is complete, the mass is transferred, without cooling, to 2000 parts of well-stirred cold water containing sufficient ice to maintain the temperature at 10° C. or below. The mass is stirred until the oil has solidified and the product is then collected by filtration, washed with cold water, and finally dried at 100°–125° C. The product may be purified, if desired, by the usual methods known to the art.

It is understood that the invention is not confined to the particulars given in this example. For example, the relative proportions of the interacting substances can vary considerably. Thus, the quantity of water in which the diethylaniline is dissolved or suspended can be increased several fold without harm, as can also the amount of sulfanilic acid, or alcohol, or sulfuric acid; and hydrochloric acid can be used in place of sulfuric acid. Further, the quantity of formaldehyde can be either increased or diminished to some extent, but the use of about five to fifteen percent in excess of one mol to every two mols of diethylaniline appears preferable. Other alcohols, such as methyl alcohol, can also be employed. No alcohol need be present, but the time required to complete the reaction is considerably lessened if it is present. The amount of sulphanilic acid may be increased even to the extent of having one or more molecular proportions or equivalents present, and metanilic acid may be used in place of sulfanilic acid. Neither sulphanilic acid or metanilic acid, when treated with formaldehyde, form stable anhydroformaldehyde compounds.

It will be noted in the above example that for each two moles of diethylaniline there is present about 1.15 moles of formaldehyde, about 0.015 moles of crystallized sodium sulphanilate and about 0.03 moles of sulfuric acid. It is readily seen that the amount of sulfuric acid is approximately twice that sufficient to liberate the sulphanilic acid, and that the amount of free sulphanilic and sulfuric acids (about 1/65 mol. each) is very small in comparison to either the diethylaniline (2 mols.) or formaldehyde (1.15 mol.) present.

It may be pointed out that the amount of sulfuric or hydrochloric acid need not be more than just sufficient to set free the sulphanilic acid from its salts, but the period of time required to complete the reaction is somewhat longer.

It may be also pointed out that the temperature at which the reaction is carried out can be varied to some extent, even as low as 50° C., but the preferred temperature is at or near that of the boiling-point of the mixture.

I claim:

1. In the production of 4.4'-tetraethyldiaminodiphenylmethane, a process which comprises treating about two molecular proportions of diethylaniline with about one molecular proportion of formaldehyde in the presence of an aromatic sulfonic acid containing an unsubstituted amino group attached to the aromatic nucleus, said acid acting as a carrier or adjuvant.

2. In the production of 4.4'-tetraethyldiaminodiphenylmethane, a process which comprises treating about two molecular proportions of diethylaniline with about one molecular proportion of formaldehyde in the presence of less than one molecular proportion of an aromatic sulfonic acid of the benzene series which contains a free primary amino group as a substituent in the benzene nucleus.

3. In the production of 4.4'-tetraethyldiaminodiphenylmethane, a process which comprises treating about two molecular proportions of diethylaniline with about one molecular proportion of formaldehyde in the presence of water, a mineral acid, and less than one molecular proportion of sulfanilic acid.

4. In the production of 4.4'-tetraethyldiaminodiphenylmethane, a process which comprises treating about two molecular proportions of diethylaniline with about one molecular proportion of formaldehyde in the presence of water, and of not more than one molecular proportion of sulfanilic acid at a temperature of about 50° to 100° C.

5. In the production of 4.4'-tetraethyldiaminodiphenylmethane, a process which comprises treating about two molecular proportions of diethylaniline with about one molecular proportion of formaldehyde in the presence of water, alcohol, sulfuric acid, and a minor fraction of one molecular proportion of sulfanilic acid.

6. The process of making 4.4'-tetraethyldiaminodiphenylmethane which comprises treating 2 mols. diethylaniline with about 1 to 1.15 mols. formaldehyde in the presence of water and alcohol, and about 1/50 to 1/70 mol. sulfuric acid and about 1/50 to 1/70 mol. sulphanilic acid at refluxing temperature for 15-30 hours.

7. The process of making 4.4'-tetraethyldiaminodiphenylmethane which comprises treating about two molecular proportions of diethylaniline with about one molecular proportion of formaldehyde in the presence of water, an unsubstituted para-aminobezene sulfonic acid and an inorganic acid at a temperature of about 95°-100° C.

8. In the method of producing 4.4'-tetraethyldiaminodiphenylmethane by the action of about one molecular proportion of formaldehyde on about two molecular proportions of diethylaniline in the presence of water, an inorganic acid and an unsubstituted primary amine sulfonic acid, the step which involves carrying out the reaction with sufficient heat to keep the reaction mixture around the boiling point.

9. In the production of 4.4'-tetraethyldiaminodiphenylmethane, a process which comprises treating about two molecular proportions of diethylaniline with about one molecular proportion of formaldehyde in the presence of an amount of sulfanilic acid which represents but a small fraction of the molecular proportions.

10. In the production of 4.4'-tetraethyldiaminodiphenylmethane, a process which comprises treating about two molecular proportions of diethylaniline with about one molecular proportion of formaldehyde in the presence of a sulfonic acid of a primary amine and a mineral acid, the amounts of sulfonic acid and of mineral acid representing but small fractions of the molecular proportions 11. In the production of 4.4'-tetraethyldiaminodiphenylmethane, a process which comprises reacting about two molecular proportions of diethylaniline with about one molecular proportion of formaldehyde in the presence of water, of an inorganic acid selected from the group comprising sulfuric acid and hydrochloric acid, and of less than one molecular proportion of an organic acid, selected from the group comprising sulfanilic acid and metanilic acid.

In testimony whereof I affix my signature.

HUGO KLADIVKO, Jr.